(12) United States Patent
Dauner

(10) Patent No.: US 9,321,489 B1
(45) Date of Patent: Apr. 26, 2016

(54) ILLUMINATED PLATFORM SYSTEM

(71) Applicant: Aaron D. Dauner, Madison, MS (US)

(72) Inventor: Aaron D. Dauner, Madison, MS (US)

( * ) Notice: Subject to any disclaimer, the term of this patent is extended or adjusted under 35 U.S.C. 154(b) by 0 days.

(21) Appl. No.: 14/336,286

(22) Filed: Jul. 21, 2014

(51) Int. Cl.
*B62D 25/20* (2006.01)
*B60Q 1/00* (2006.01)

(52) U.S. Cl.
CPC .............. *B62D 25/20* (2013.01); *B60Q 1/0017* (2013.01)

(58) Field of Classification Search
CPC ............ F21W 2131/1005; F21L 14/04; F21L 2005/00; F21L 2003/00
USPC ........................................ 296/184.1; 362/153
See application file for complete search history.

(56) References Cited

U.S. PATENT DOCUMENTS

| | | | | |
|---|---|---|---|---|
| 2,377,211 A * | 5/1945 | Cocken, Jr | ....................... | 404/40 |
| 3,500,606 A * | 3/1970 | Wharmby | ..................... | 52/591.1 |
| 4,008,548 A * | 2/1977 | Leclerc | ............................ | 52/180 |
| 4,329,739 A * | 5/1982 | Loebner | ......................... | 362/153 |
| 4,340,929 A * | 7/1982 | Konikoff et al. | .............. | 362/153 |
| 4,436,779 A * | 3/1984 | Menconi et al. | .............. | 428/169 |
| 4,759,162 A * | 7/1988 | Wyse | ........................... | 52/126.6 |
| 6,116,751 A * | 9/2000 | Remp | ........................... | 362/153 |
| 6,722,728 B2 | 4/2004 | Borugian | | |
| 6,793,272 B2 | 9/2004 | Borugian | | |
| 7,125,137 B2 * | 10/2006 | Kitajima et al. | .............. | 362/153 |
| D546,267 S | 7/2007 | Burchett | | |
| 7,407,307 B2 * | 8/2008 | Hiratsuka | ..................... | 362/304 |
| 7,806,465 B2 * | 10/2010 | Burchett et al. | ........... | 296/184.1 |
| 8,122,989 B2 * | 2/2012 | Burchett et al. | .............. | 180/68.5 |
| 8,407,951 B2 * | 4/2013 | Haney et al. | .................... | 52/177 |
| 8,444,287 B2 * | 5/2013 | Hardesty | ....................... | 362/153 |
| 9,068,720 B2 * | 6/2015 | Mangus | | |
| 2006/0126330 A1 * | 6/2006 | Yen | ............................... | 362/253 |
| 2012/0201014 A1 * | 8/2012 | Van Herpen et al. | ......... | 362/153 |
| 2013/0322110 A1 * | 12/2013 | Cantu et al. | ................... | 362/602 |

\* cited by examiner

*Primary Examiner* — H Gutman
(74) *Attorney, Agent, or Firm* — Neustel Law Offices; Jason L. Gilbert

(57) ABSTRACT

An illuminated platform system which improves safety by providing an illuminated and non-slip surface adapted for lining a surface such as a truck frame. The illuminated platform system generally includes one or more platforms which are adapted to be secured to a surface such as a truck frame. Each of the platforms is interlockable utilizing side apertures extending along the outer perimeter of the platforms in combination with fasteners and anchors. A light source such as a light string is positioned within an outer channel extending along the lower surface of the platforms. Light from the light source will emanate through both the side apertures and a plurality of upper apertures which extend along the outer perimeter of the platform along its upper surface. By interlocking the platforms and activating the light source, the surface such as a truck frame may be safely illuminated and adapted to store heavy objects.

7 Claims, 11 Drawing Sheets

ILLUMINATED PLATFORM SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a safety platform and more specifically it relates to an illuminated platform system which improves safety by providing an illuminated and non-slip surface adapted for lining a surface such as a truck frame.

2. Description of the Related Art

Any discussion of the related art throughout the specification should in no way be considered as an admission that such related art is widely known or forms part of common general knowledge in the field.

Workers such as truck drivers are often required to work in the dark. Generally, trucks are not equipped with frame decks from the factory. Drivers and service personnel spend a lot of time on the back frame rails of trucks hooking up air lines and performing maintenance. Prior art platforms are generally made of metals such as aluminum or steel which can dent, crack, and rust. Further, no visibility indicators are provided for safety.

Because of the inherent problems with the related art, there is a need for a new and improved illuminated platform system which improves safety by providing an illuminated and non-slip surface adapted for lining a surface such as a truck frame.

BRIEF SUMMARY OF THE INVENTION

The invention generally relates to a safety platform system which includes one or more platforms which are adapted to be secured to a surface such as a truck frame. Each of the platforms are interlockable utilizing side apertures extending along the outer perimeter of the platforms in combination with fasteners and anchors. A light source such as a light string is positioned within an outer channel extending along the lower surface of the platforms. Light from the light source will emanate through both the side apertures and a plurality of upper apertures which extend along the outer perimeter of the platform along its upper surface. By interlocking the platforms and activating the light source, the surface such as a truck frame may be safely illuminated and adapted to store heavy objects.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
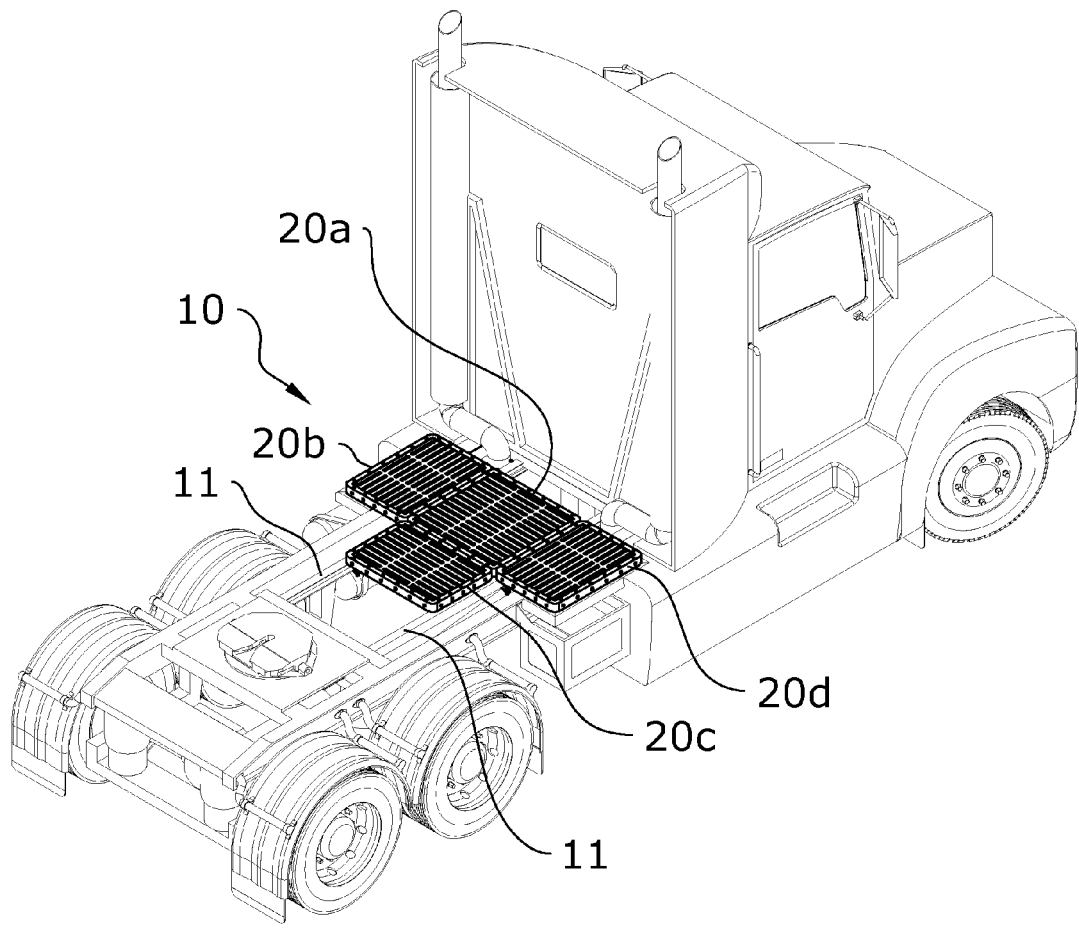
FIG. 1 is an upper perspective view of the present invention installed on a truck frame.

A. Overview.

Turning now descriptively to the drawings, in which similar reference characters denote similar elements throughout the several views, FIGS. 1 through 11 illustrate a illuminated platform system 10, which comprises one or more platforms 20 which are adapted to be secured to a surface such as a truck frame. Each of the platforms 20 are interlockable utilizing side apertures 30, 32, 34, 36 extending along the outer perimeter 27 of the platforms 20 in combination with fasteners 12 and anchors 13. A light source 60 such as a light string is positioned within an outer channel 50 extending along the lower surface 26 of the platforms 20. Light from the light source 60 will emanate through both the side apertures 30, 32, 34, 36 and a plurality of upper apertures 40, 42, 44, 46 which extend along the outer perimeter 27 of the platform 20 along its upper surface 25. By interlocking the platforms 20 and activating the light source 60, the surface such as a truck frame may be safely illuminated and adapted to store heavy objects.

B. Platforms.

Figure 2:
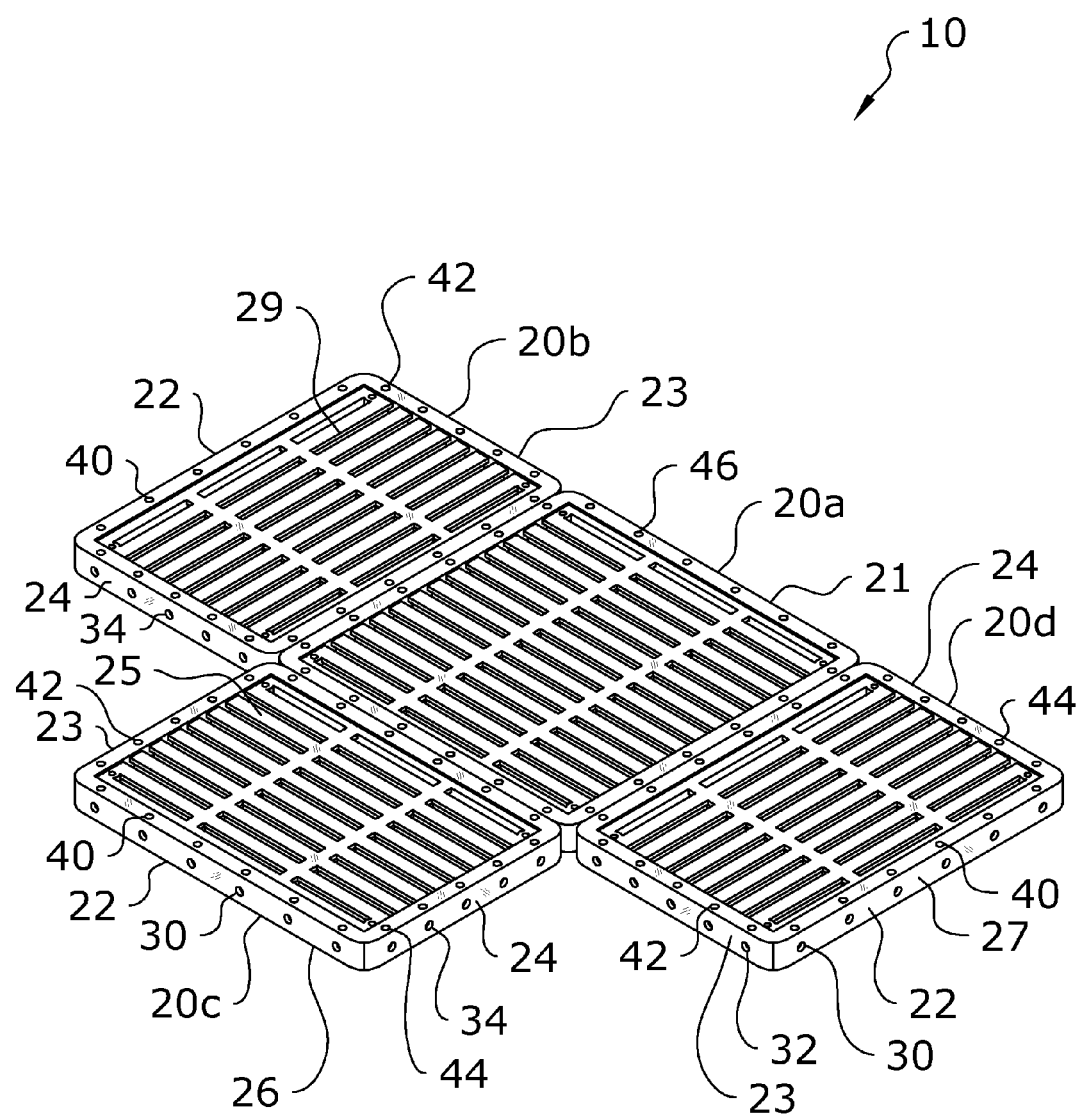
FIG. 2 is an upper perspective view of the present invention.
Figure 3:
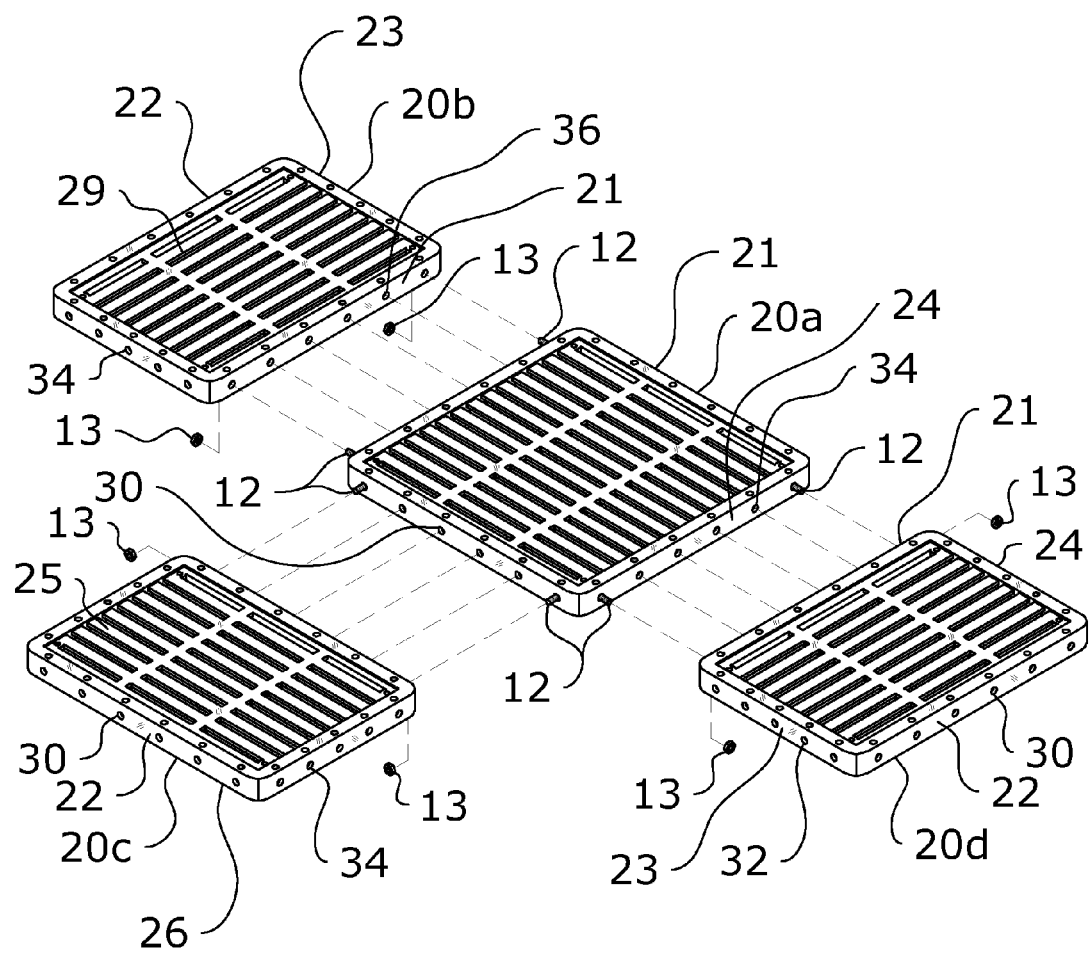
FIG. 3 is an upper perspective exploded view of the present invention.

As shown in FIG. 1, the present invention comprises one or more platforms 20 which are adapted to be mounted to the floor-level of a structure, such as a truck frame. The platforms 20 are shown in the figures as being rectangular, though it should be appreciated that other shapes may be utilized in different embodiments. It is preferable, however, that the platforms 20 be of such a shape to allow them to be efficiently and easily interlocked together such as shown in FIGS. 1 and 2.

Figure 4:
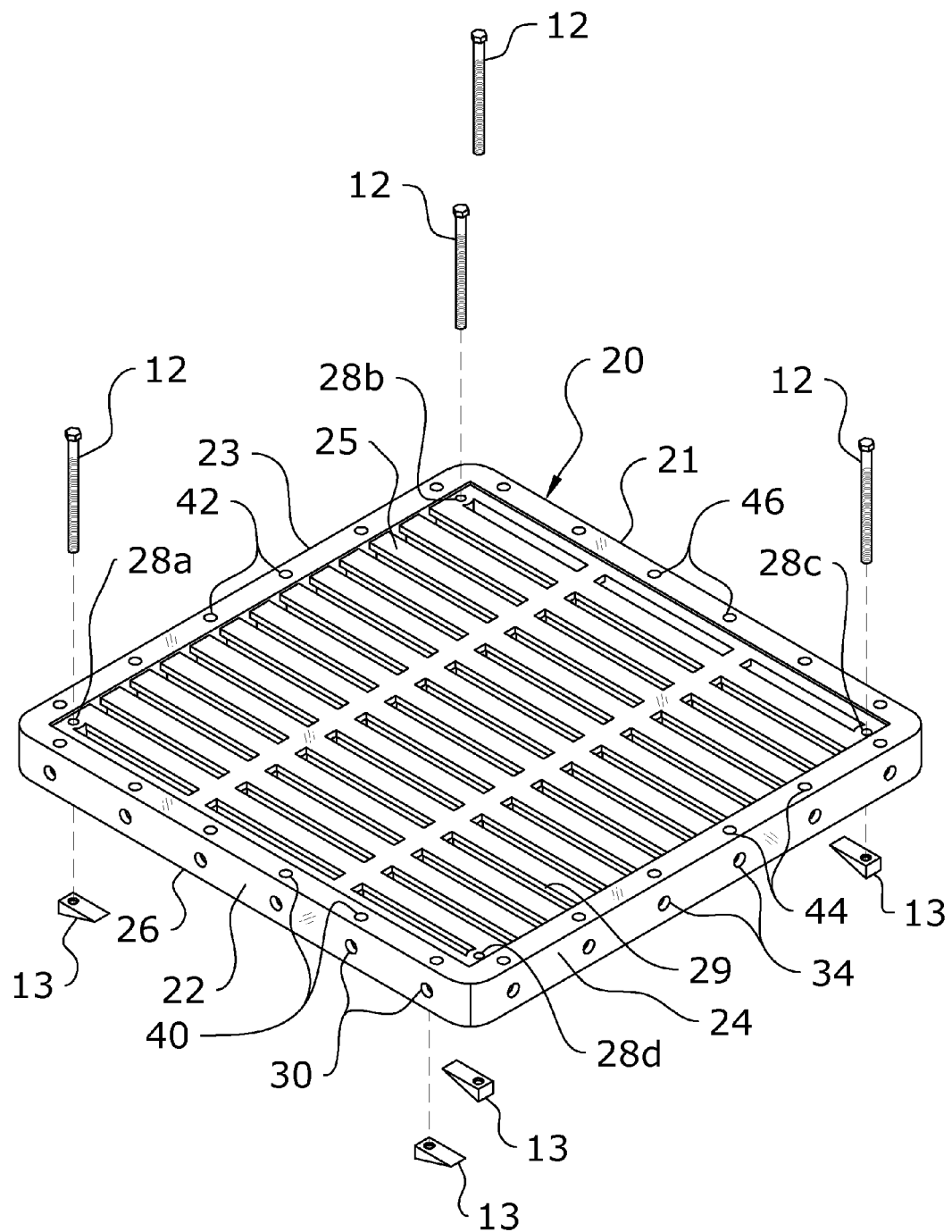
FIG. 4 is an upper perspective view of a platform of the present invention.
Figure 5:
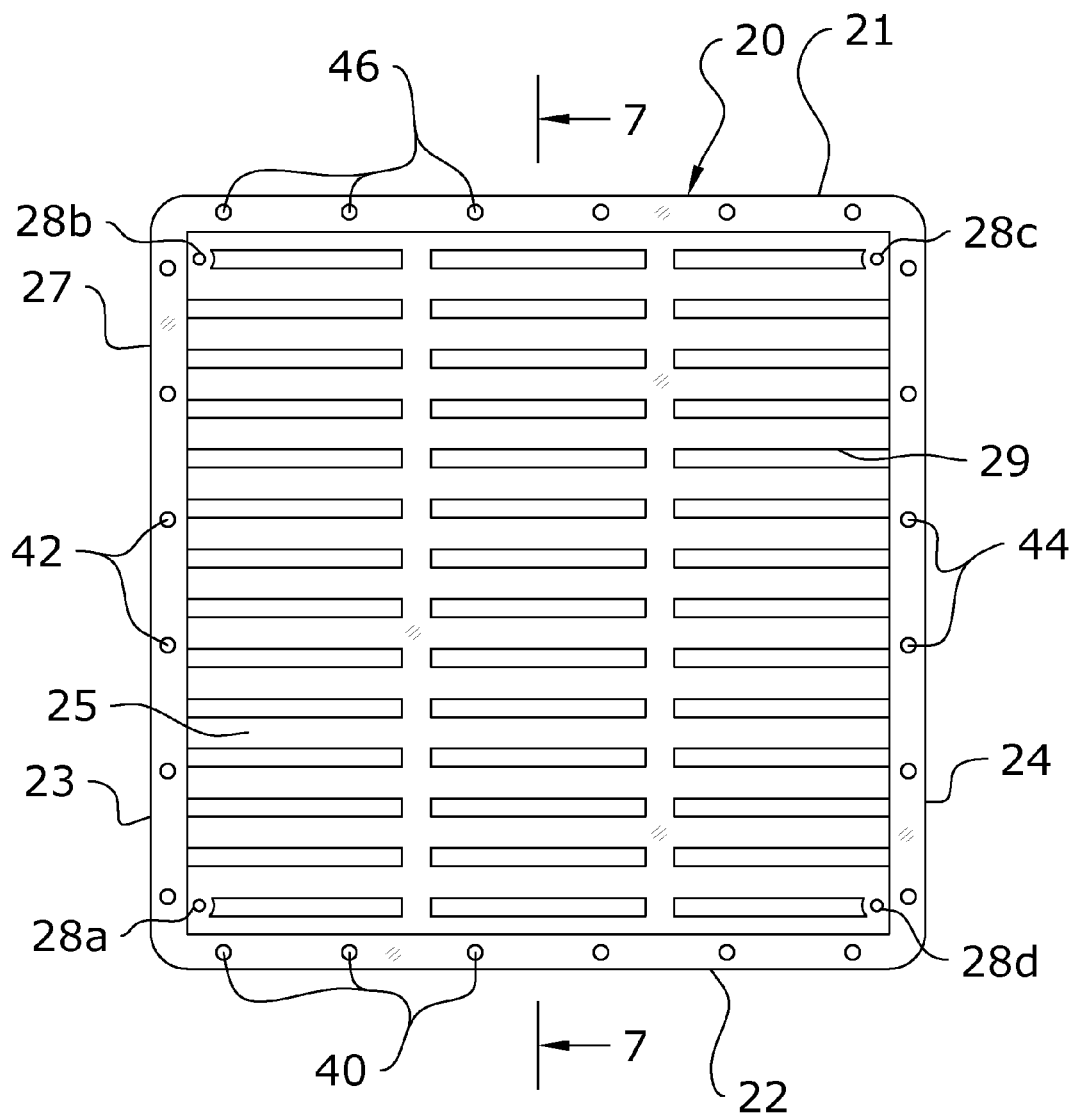
FIG. 5 is a top view of a platform of the present invention.
Figure 6:
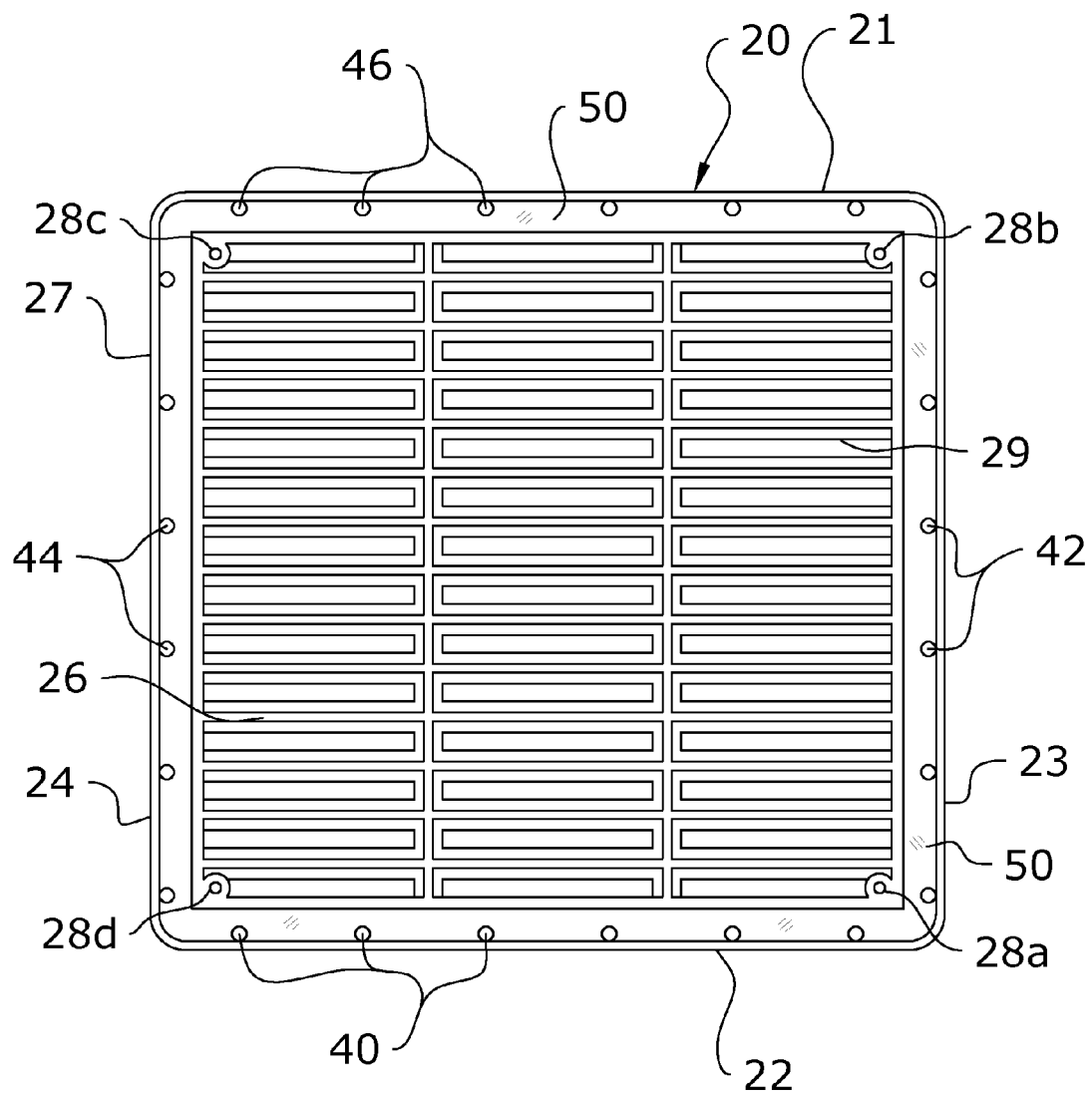
FIG. 6 is a bottom view of a platform of the present invention.
Figure 7:
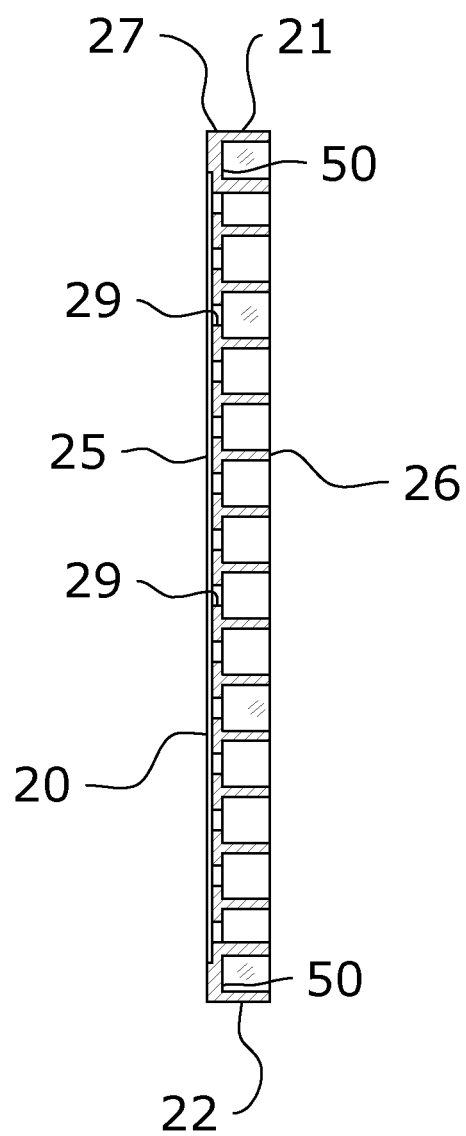
FIG. 7 is a side view of a platform of the present invention.
Figure 8:
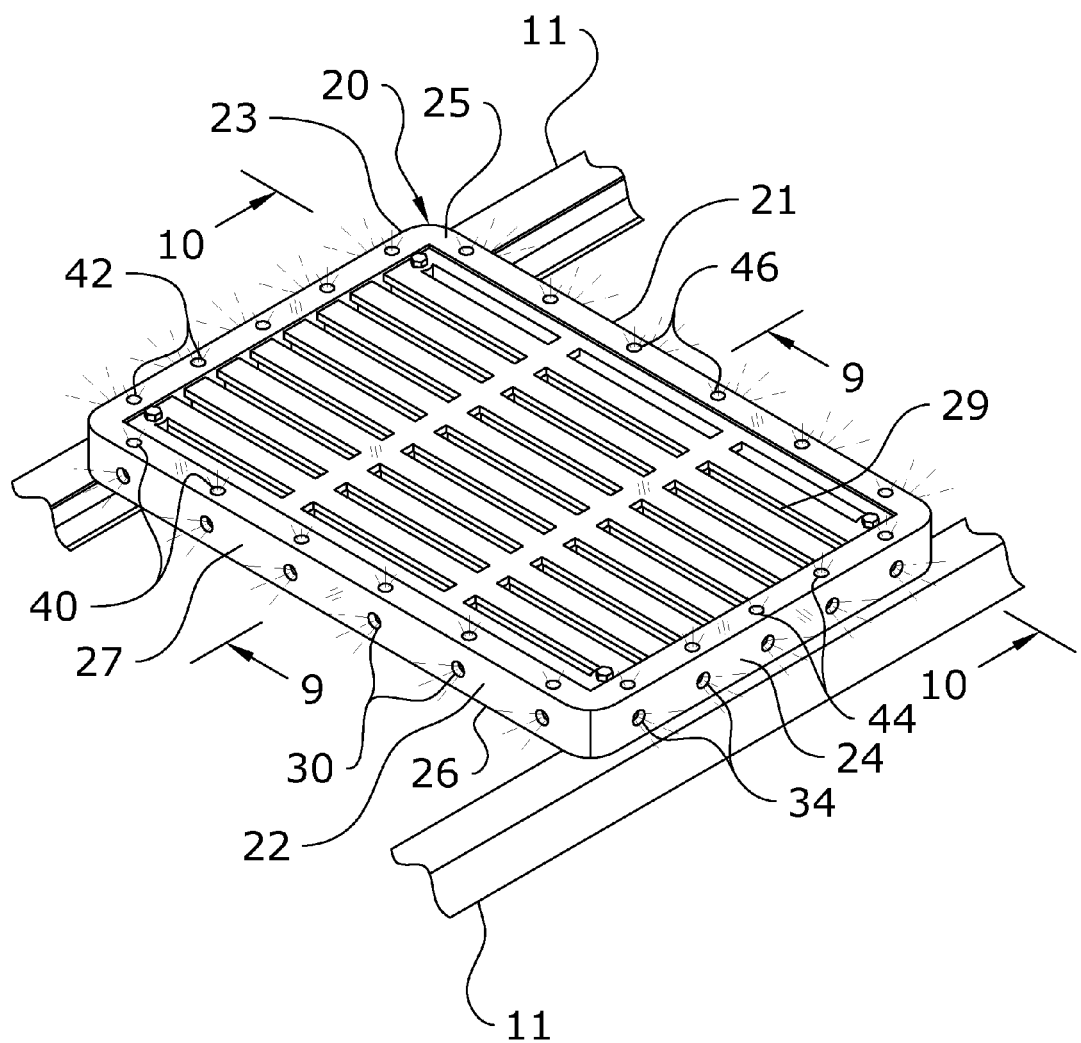
FIG. 8 is an upper perspective view of a platform of the present invention installed on rails.
Figure 9:
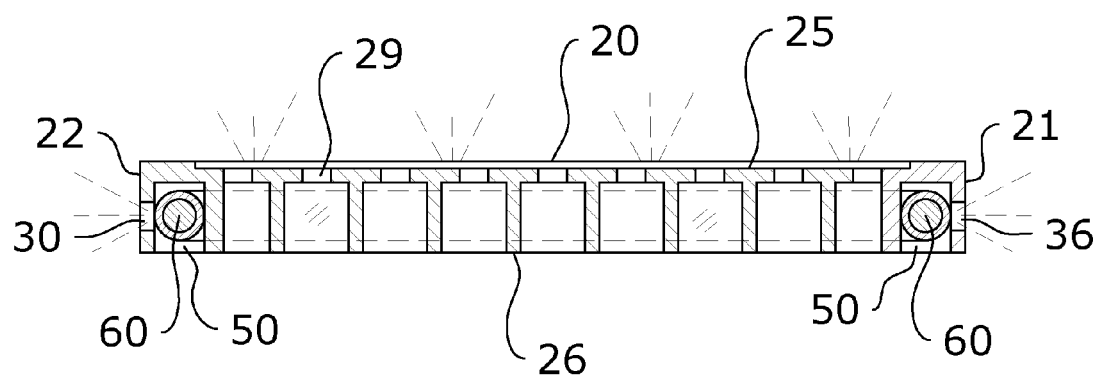
FIG. 9 is an end view of a platform of the present invention with light source illuminated.
Figure 10:
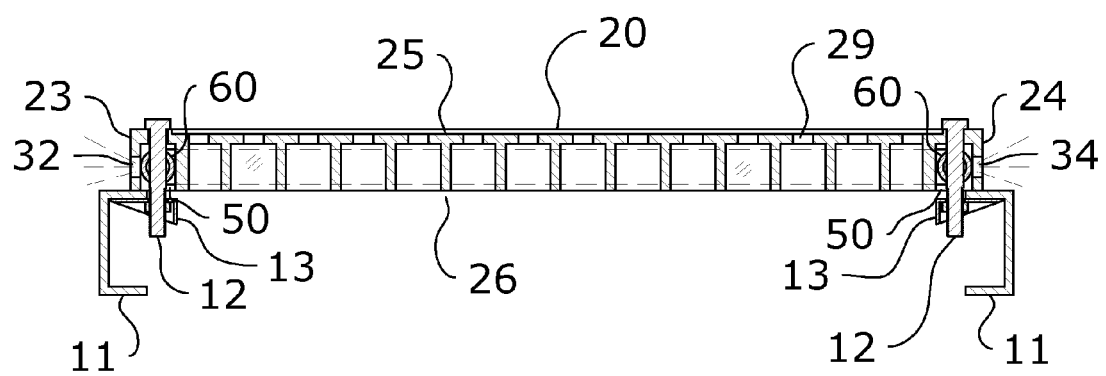
FIG. 10 is an end view of a platform of the present invention installed on rails.

As best shown in FIG. 4, the platform 20 of the present invention comprises a first end 21, a second end 22 opposite the first end 21, a first side 23, and a second side 24 opposite the first side 23. The platform 20 also includes an upper surface 25, a lower surface 26, and an outer perimeter 27. However, as noted, the general shape of the platform 20 may vary and thus one of the ends 21, 22 or sides 23, 24 may be omitted in some embodiments.

Mounting apertures 28a,b,c,d are generally provided to secure the platform 20 of the present invention to an object or vehicle, such as rails 11 on a truck frame. The numbering, placement, and configuration of the mounting apertures 28a, b,c,d may vary in different embodiments. In a preferred embodiment, a first mounting aperture 28a extends through the platform 20 between its upper and lower surfaces 25, 26 at the intersection of the second end 22 and first side 23. A second mounting aperture 28b similarly extends through the platform 20 at the intersection of its second end 22 and first side 23. A third mounting aperture 28c extends through the platform 20 at the intersection of its first end 21 and second side 24. A fourth mounting aperture 28d extends through the platform 20 at the intersection of its second end 22 and second side 24.

The upper surface 25 may include a plurality of slots 29, divets, or other grip-improving features to aid in preventing objects or people from slipping from the upper surface 25 of the platform 20. The use of slots 29 may also increase stability and reinforce the strength of the platform 20. The numbering, placement, configuration and type of slots 29 used may vary in different embodiments.

The platform 20 may be comprised of various materials, so long as the material used it capable of withstanding common usage in high traffic situations and be adapted to safely retain high volume or high weight materials without warping, breaking, or becoming otherwise structurally compromised. In a preferred embodiment, the platform 20 is comprised of plastic which is molded as a single, integral unit. In other embodiments, the platform 20 may be comprised of different, discrete sections or portions which are interconnected with each other. The platform 20 may also include additional structural stiffening supports mounted internal or otherwise, including but not limited to steel, aluminum, plastics, resins, fiberglass, and the like.

As shown throughout the figures, the platform 20 includes a plurality of apertures 30, 32, 34, 36, 40, 42, 44, 46 through which light may be emanated from the platform 20 through usage of a light source 60. The placement, numbering, size, spacing, and other aspects of the apertures 30, 32, 34, 36, 40, 42, 44, 46 may vary in different embodiments. Thus, the configuration of the apertures 30, 32, 34, 36, 40, 42, 44, 46 shown in the exemplary figures should not be construed as limiting on the scope of the present invention.

Figure 11:
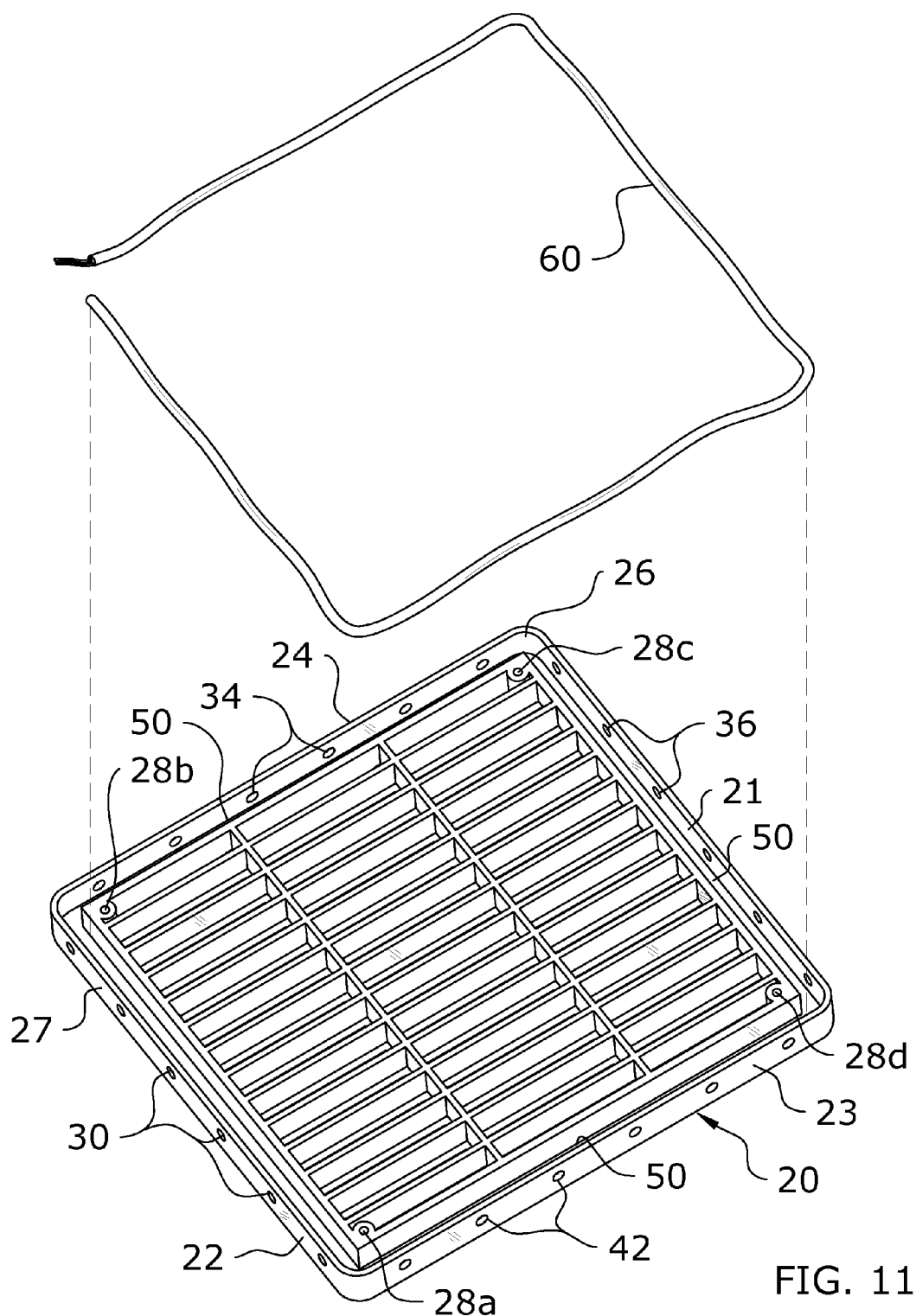
FIG. 11 is a bottom perspective view of the present invention with a light source aligned for insertion into the outer channel.

In a preferred embodiment as shown in the figures, the outer perimeter 27 of the platform 20 will be encircled with apertures 30, 32, 34, 36, 40, 42, 44, 46 so as to maximize the illumination of the platform 20 for night-time use. As best shown in FIG. 11, a plurality of side apertures 30, 32, 34, 36 extend through the sides 23, 24 and ends 21, 22 of the platform 20. The first side apertures 30 extend along the second end 22 of the platform 20. The second side apertures 32 extend along the first side 23 of the platform 20. The third side apertures 34 extend along the second side 24 of the platform. The fourth side apertures 36 extend along the first end 21 of the platform 20.

The present invention may also include a plurality of upper apertures 40, 42, 44, 46 as best shown in FIG. 4. The upper apertures 40, 42, 44, 46 extend along the upper surface 25 of the platform 20 adjacent to its outer perimeter 27. In the exemplary embodiment shown, first upper apertures 40 extend along the upper surface 25 adjacent to the second end 22 of the platform 20. Second upper apertures 42 extend along the upper surface 25 adjacent to the first side 23 of the platform 20. Third upper apertures 44 extend along the upper surface 25 adjacent to the first end 21 of the platform 20. Fourth upper apertures 46 extend along the upper surface 25 adjacent to the second side 24 of the platform 20.

C. Light Source.

The present invention includes a light source 60 which emanates light through the apertures 30, 32, 34, 36, 40, 42, 44, 46 encircling the outer perimeter 27 of the platform 20. In a preferred embodiment, the lower surface 26 of the platform 20 includes an outer channel 50 which extends into the lower surface 26 adjacent to the outer perimeter 27 of the platform 20 as best shown in FIG. 11. The light source 60 will preferably be positioned within this outer channel 50 when the present invention is in use.

The placement, configuration, positioning, and type of light source 60 may vary in different embodiments. The light source 60 could comprise a single light or a plurality of lights, such as a plurality of light emitting diodes. In a preferred embodiment the light source 60 comprises a light string as shown in the figures which is inserted and retained within the outer channel 50. Use of this configuration allows for ease-of-use in replacing the light source 60 if necessary.

D. Operation of Preferred Embodiment.

In use, one or more platforms 20 will be secured to a surface such as rails 12 of a truck frame. FIG. 1 illustrates a first platform 20a, a second platform 20b, a third platform 20c, and a fourth platform 20d which are interconnected with each other and secured to the truck frame. More or less platforms 20 may be used in different embodiments.

The platforms 20 are interconnected to each other using the side apertures 30, 32, 34, 36 in connection with fasteners 12 and anchors 13 such as the nuts and bolts shown in the figures. The platforms 20 are secured to the surface, such as rails 11, by using fasteners 12 and anchors 13 as best shown in FIG. 4. The light source 60 may be illuminated at night-time or in other dark environs to aid in sight while traversing the platforms 20. The platforms 20 are adapted to retain heavy and high volume objects thereon without slipping or sliding off.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An illuminated platform system, comprising:
   a platform adapted to be secured to a truck frame, wherein said platform comprises an upper surface and a lower surface;
   a plurality of side apertures extending along one or more sides of said platform;
   a plurality of mounting apertures for mounting said platform to said truck frame, wherein said plurality of mounting apertures each extend between said upper surface and said lower surface of said platform;
an outer channel extending along said lower surface of said platform adjacent to an outer perimeter of said platform; and
a light string removably positioned within said outer channel; and
a plurality of upper apertures extending along said upper surface of said platform above said outer channel, wherein light from said light string emanates through said plurality of upper apertures.

2. The illuminated platform system of claim 1, wherein said platform includes a plurality of slots extending between said upper surface and said lower surface.

3. The illuminated platform system of claim 1, wherein said plurality of upper apertures extends adjacent to an outer perimeter of said platform.

4. An illuminated platform system, comprising:
a truck including a frame; and
a plurality of interlockable platforms removably secured to said frame, wherein each of said plurality of interlockable platforms comprises:
a plurality of side apertures extending along one or more sides of said platforms;
a plurality of mounting apertures for mounting said platform to said truck frame, wherein said plurality of mounting apertures each extend between an upper surface and a lower surface of said platform;
an outer channel extending along said lower surface of said platforms adjacent to an outer perimeter of said platform;
a light string removably positioned with said outer channel; and
a plurality of upper apertures extending along said upper surface of said platform above said outer channel, wherein light from said light string emanates through said plurality of upper apertures.

5. The illuminated platform system of claim 4, wherein each of said platforms is comprised of plastic.

6. The illuminated platform system of claim 4, wherein each of said platforms includes a plurality of slots extending between said upper surface and said lower surface.

7. The illuminated platform system of claim 4, wherein said plurality of upper apertures extends adjacent to an outer perimeter of said platform.

\* \* \* \* \*